(12) United States Patent
Lee et al.

(10) Patent No.: US 11,508,986 B2
(45) Date of Patent: Nov. 22, 2022

(54) ELECTRODE TRANSFER DEVICE FOR BATTERY CELL

(71) Applicant: LG CHEM, LTD., Seoul (KR)

(72) Inventors: Sang-Kyun Lee, Daejeon (KR);
Baeck-Boem Choi, Daejeon (KR);
Cha-Hun Ku, Daejeon (KR);
Min-Wook Kim, Daejeon (KR);
Jin-Gon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 247 days.

(21) Appl. No.: 16/612,791

(22) PCT Filed: Jan. 3, 2019

(86) PCT No.: PCT/KR2019/000102
§ 371 (c)(1),
(2) Date: Nov. 12, 2019

(87) PCT Pub. No.: WO2019/146925
PCT Pub. Date: Aug. 1, 2019

(65) Prior Publication Data
US 2020/0203754 A1    Jun. 25, 2020

(30) Foreign Application Priority Data

Jan. 24, 2018 (KR) ........................ 10-2018-0008847

(51) Int. Cl.
*H01M 10/04* (2006.01)
*H01M 10/0525* (2010.01)

(52) U.S. Cl.
CPC ..... *H01M 10/049* (2013.01); *H01M 10/0404* (2013.01); *H01M 10/0525* (2013.01)

(58) Field of Classification Search
CPC .......... H01M 10/049; H01M 10/0404; H01M 10/0525
(Continued)

(56) References Cited

U.S. PATENT DOCUMENTS

2005/0183669 A1    8/2005    Parkhe et al.
2009/0039581 A1    2/2009    Onishi et al.
(Continued)

FOREIGN PATENT DOCUMENTS

CN    103222097 A    7/2013
DE    19927946 A1    1/2001
(Continued)

OTHER PUBLICATIONS

Extended European Search Report issued from the European Patent Office dated Jul. 14, 2020 in corresponding European patent application No. 19743136.4.
(Continued)

*Primary Examiner* — Sean P Cullen
(74) *Attorney, Agent, or Firm* — Morgan, Lewis & Bockius LLP

(57) ABSTRACT

An electrode transferring apparatus of a battery cell includes: a transferring body configured to transfer at least one electrode of the battery cell; and an electrode gripper mounted to the transferring body to be vertically movable, the electrode gripper being configured to grip at least one electrode of the battery cell and having a rounded end in contact with the at least one electrode.

6 Claims, 3 Drawing Sheets

(58) Field of Classification Search
USPC .................................................. 29/623.1, 730
See application file for complete search history.

(56) References Cited

U.S. PATENT DOCUMENTS

| | | | |
|---|---|---|---|
| 2011/0039160 A1 | 2/2011 | Takahata et al. | |
| 2013/0074665 A1 | 3/2013 | Shijo et al. | |
| 2013/0240323 A1 | 9/2013 | Min et al. | |
| 2020/0127317 A1* | 4/2020 | Lee .................. | H01M 10/0409 |

FOREIGN PATENT DOCUMENTS

| | | | | |
|---|---|---|---|---|
| EP | 2917002 | | 9/2014 | |
| EP | 2917002 A1 | | 9/2015 | |
| EP | 3122672 | | 2/2017 | |
| JP | S60-132765 A | | 7/1985 | |
| JP | H09-115507 A | | 5/1997 | |
| JP | 11322070 A | * | 11/1999 | |
| JP | 2003-068287 A | | 3/2003 | |
| KR | 10-2007-0111511 A | | 11/2007 | |
| KR | 10-2013-0051956 A | | 5/2013 | |
| KR | 20130092806 A | * | 8/2013 | |
| KR | 10-1400256 B1 | | 5/2014 | |
| KR | 10-2014-0089237 A | | 7/2014 | |
| KR | 10-2016-0106932 A | | 9/2016 | |
| KR | 10-2016-0108896 A | | 9/2016 | |
| KR | 2017103332 A | * | 9/2017 | ........ H01M 10/0404 |
| KR | 1020170112895 A | | 10/2017 | |
| KR | 10-1800065 B1 | | 11/2017 | |
| WO | WO-9744845 A1 | * | 11/1997 | ........ H01M 10/0409 |
| WO | WO-2017171160 A1 | * | 10/2017 | ........ H01M 10/0459 |

OTHER PUBLICATIONS

International Search Report issued in corresponding International Patent Application No. PCT/KR2019/000102, dated Apr. 18, 2019.

* cited by examiner

ELECTRODE TRANSFER DEVICE FOR BATTERY CELL

TECHNICAL FIELD

The present disclosure relates to an electrode transferring apparatus of a battery cell.

The present application claims priority to Korean Patent Application No. 10-2018-0008847 filed on Jan. 24, 2018 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. Here, the battery cells configuring the battery module or the battery pack are generally pouch-type secondary batteries that may be easily stacked on one another.

In the conventional secondary battery, recently, there has been an increasing tendency to directly use lithium metal (Li metal) as a negative electrode material of an electrode. However, since the lithium metal has a relatively loose characteristic, the surface of the electrode may be scratched when an electrode transferring device is gripped for transferring the electrode during the assembling process. Moreover, the scratch on the surface of the electrode may adversely affect the safety of the electrode.

Thus, it is required to find a way to provide an electrode transferring apparatus of a battery cell, which may prevent the surface of the electrode from being scratched while the electrode of the battery cell is being transferred.

DISCLOSURE

Technical Problem

The present disclosure is directed to providing an electrode transferring apparatus of a battery cell, which may prevent the surface of an electrode from being scratched while the electrode of the battery cell is being transferred.

Technical Solution

In one aspect of the present disclosure, there is provided an electrode transferring apparatus of a battery cell, comprising: a transferring body configured to transfer at least one electrode of the battery cell; and an electrode gripper mounted to the transferring body to be vertically movable, the electrode gripper being configured to grip at least one electrode of the battery cell and having a rounded end in contact with the at least one electrode.

The electrode gripper may be provided in a pair, and the pair of electrode grippers may grip the at least one electrode while vertically moving at an upper side and a lower side of the at least one electrode.

The electrode gripper may include a gripper body connected to the transferring body to be vertically movable therefrom; and at least one gripper handle configured to protrude from the gripper body, wherein the at least one gripper handle may be in contact with an edge of the at least one electrode and has a rounded shape.

The gripper handle may be provided in a pair, and the pair of gripper handles may be spaced apart from each other by a predetermined distance and be in contact with both ends of the edge of the at least one electrode.

The end of electrode gripper in contact with the at least one electrode may be coated by DLC.

The at least one electrode may be a lithium metal electrode, and the battery cell may be a secondary battery.

Advantageous Effects

According to various embodiments as above, it is possible to provide an electrode transferring apparatus of a battery cell, which may prevent the surface of an electrode from being scratched while the electrode of the battery cell is being transferred.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
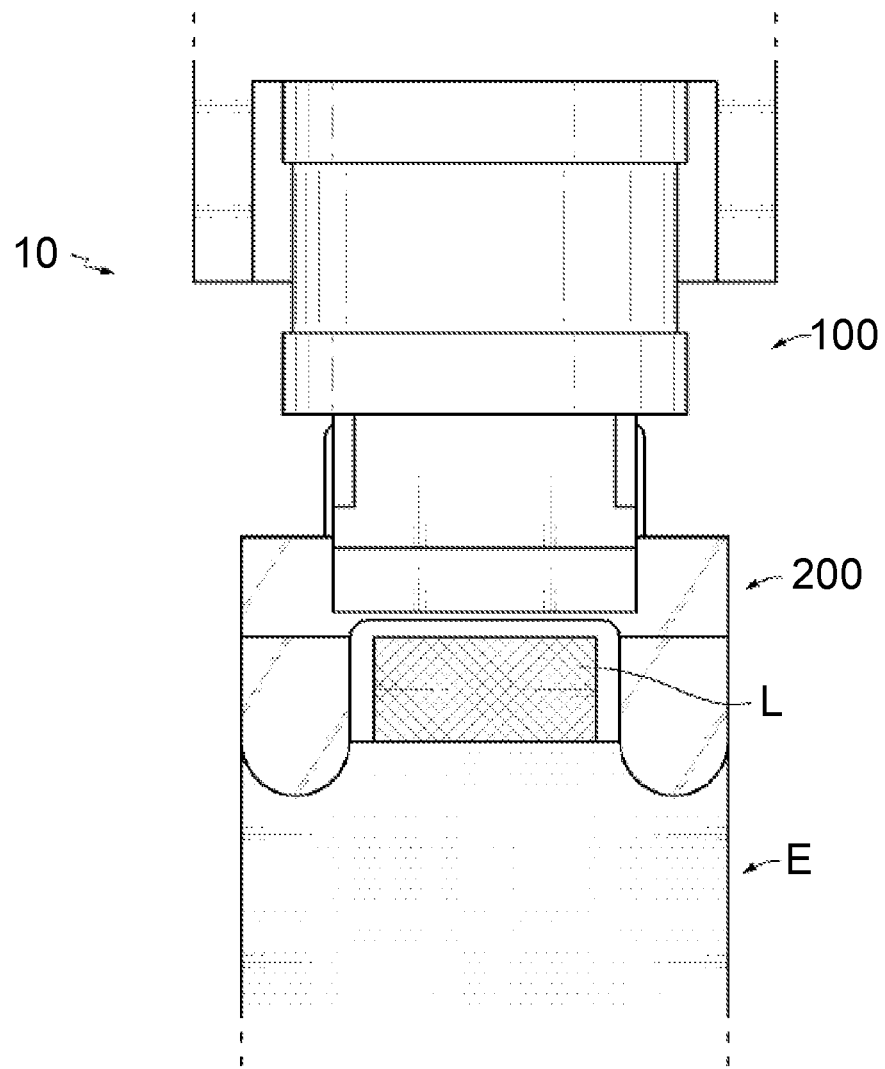
FIG. 1 is a diagram for illustrating an electrode transferring apparatus of a battery cell according to an embodiment of the present disclosure.
Figure 2:
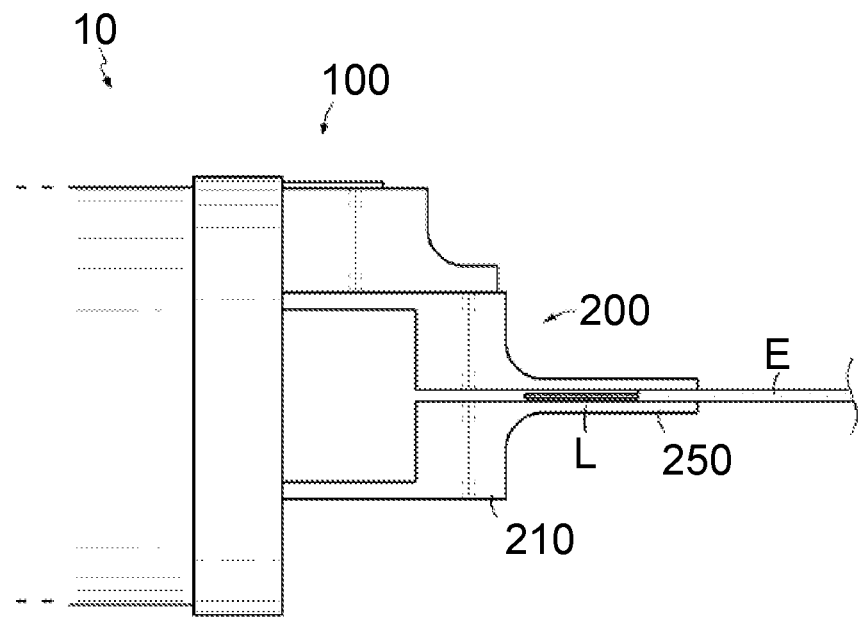
FIG. 2 is a side view showing the electrode transferring apparatus of a battery cell of FIG. 1.
Figure 3:
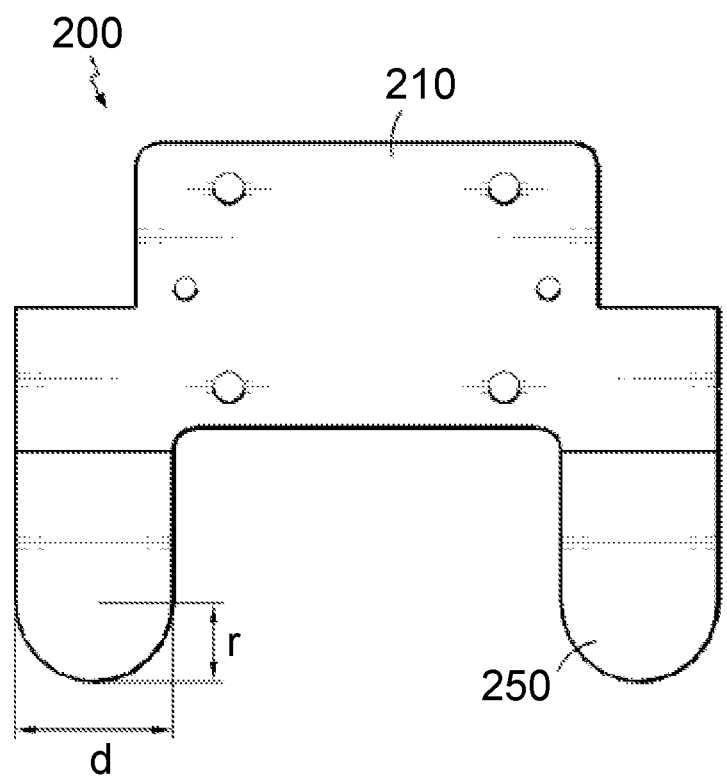
FIG. 3 is a diagram for illustrating an electrode gripper of the electrode transferring apparatus of a battery cell of FIG. 1.

FIG. 1 is a diagram for illustrating an electrode transferring apparatus of a battery cell according to an embodiment of the present disclosure, FIG. 2 is a side view showing the electrode transferring apparatus of a battery cell of FIG. 1, and FIG. 3 is a diagram for illustrating an electrode gripper of the electrode transferring apparatus of a battery cell of FIG. 1.

Referring to FIGS. 1 to 3, an electrode transferring apparatus 10 for transferring at least one electrode E of a battery cell may include a transferring body 100 and an electrode gripper 200. Here, the battery cell may be a secondary battery, and the at least one electrode E may be a lithium metal electrode which has a lithium metal as a negative electrode material.

The transferring body 100 is for transferring at least one electrode E of the battery cell, and may include various components such as a motor for transferring, a transfer arm, and the like.

The electrode gripper 200 is mounted to the transferring body 100 so as to be vertically movable and may grip at least one electrode E of the battery cell to transfer the electrode E. The electrode gripper 200 may have a rounded end in contact with the at least one electrode E, and the end of the electrode gripper 200 in contact with the at least one electrode E may be coated by DLC (Diamond Like Coating).

Hereinafter, the electrode gripper 200 of this embodiment will be described in more detail.

The electrode gripper 200 may be provided in a pair.

The pair of electrode grippers 200 may grip the at least one electrode E while vertically moving at an upper side and a lower side of the at least one electrode E, respectively.

The electrode gripper 200 may include a gripper body 210 and a gripper handle 250.

The gripper body 210 may be connected to the transferring body 100 so as to be vertically movable therefrom.

The gripper handle 250 may be provided to protrude from the gripper body 210. The surface of the gripper handle 250 may be coated with a particle coating material, and in this embodiment, the surface of the gripper handle 250 may be coated by DLC.

The gripper handle 250 may be provided in a pair.

The pair of gripper handles 250 may be in contact with the edge of the at least one electrode E when the electrode gripper 200 grips the at least one electrode E.

Specifically, the pair of gripper handles 250 may be spaced apart from each other by a predetermined distance and may contact both ends of the edge of the at least one electrode E between lead connection portions L of the at least one electrode E. Here, the portions of the pair of gripper handles 250 in contact with both ends of the edge of the at least one electrode E may be rounded. The diameter (d) of each gripper handle 250 may be 20 mm, and the radius (r) of the rounded portion may be 10 mm.

In this embodiment, when the electrode gripper 200 grips the at least one electrode E, the gripper handle 250 in contact with the at least one electrode E is rounded and coated by DLC, so the stress applied to the at least one electrode E is reduced, thereby minimizing the damage of the surface of the electrode E due to friction.

As described above, in this embodiment, the electrode transferring apparatus 10 may prevent the surface of the electrode E from being damaged or scratched while the electrode E of the battery cell is being transferred. Accordingly, in this embodiment, it is possible to prevent the safety of the electrode E from being damaged due to breakage or scratch of the electrode E.

Figure 4:
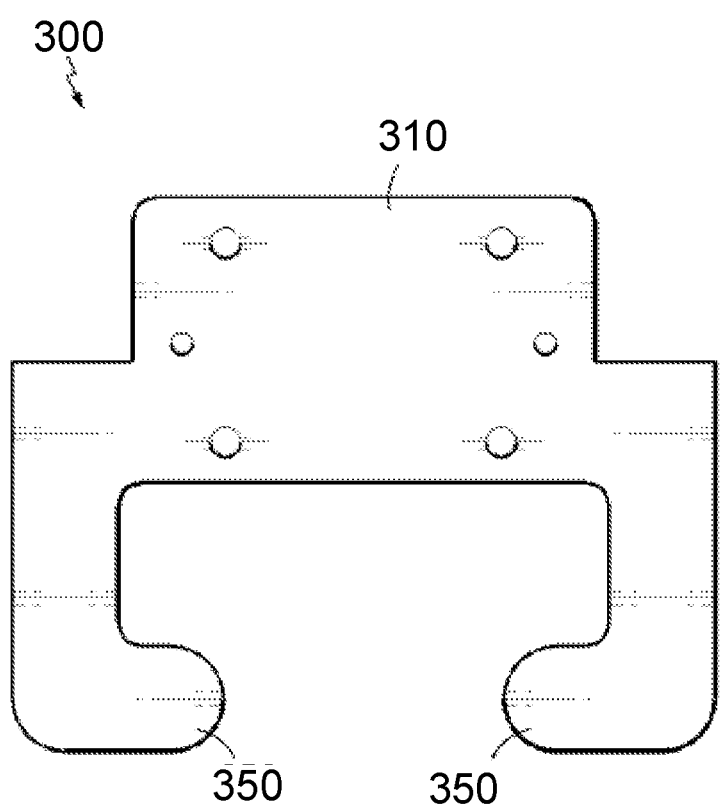
FIG. 4 is a diagram for illustrating an electrode gripper according to another embodiment of the present disclosure.

FIG. 4 is a diagram for illustrating an electrode gripper according to another embodiment of the present disclosure.

The electrode gripper 300 of this embodiment is similar to the electrode gripper 200 of the former embodiment, and thus features identical or similar to the former embodiment will not be described in detail again, and features different from the former embodiment will be described in detail.

Referring to FIG. 4, the electrode gripper 300 may include a gripper body 310 and a gripper handle 350.

The gripper body 310 is substantially identical or similar to the gripper body 210 of the former embodiment and will not be described again.

The gripper handle 350 is provided in a pair, and the ends of the pair of gripper handles 350 may be bent toward each other. The gripper handles 350 may be in contact with both ends of the edge of the at least one electrode E at positions out of both sides of the edge of the at least one electrode E (see FIG. 1).

As described above, in the case of the electrode gripper 300 of this embodiment, when the electrode gripper 300 grips the at least one electrode E, the gripper handle 350 is disposed to surround both ends of the edge of the at least one electrode E at positions out of both sides of the edge of the at least one electrode E, thereby gripping the electrode E more stably.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. An electrode transferring apparatus of a battery cell, comprising:
    a transferring body configured to transfer at least one electrode of the battery cell; and
    an electrode gripper mounted to the transferring body, being configured to grip the at least one electrode of the battery cell and including
        a gripper body connected to the transferring body, and
        a pair of gripper handles respectively protruding from sides of the gripper body and having a bent shape bent such that distal ends of the gripper handles face toward each other and are configured to be in contact with an edge of the at least one electrode,
    wherein the distal ends of the gripper handles have a rounded shape.

2. The electrode transferring apparatus of a battery cell according to claim 1, wherein a diameter of each of the gripper handles is 20 mm.

3. The electrode transferring apparatus of a battery cell according to claim 1, wherein the rounded shape of the distal ends of each of the gripper handles has a radius of 10 mm.

4. The electrode transferring apparatus of a battery cell according to claim 1,
    wherein the end of electrode gripper in contact with the at least one electrode is coated by a diamond coating.

5. The electrode transferring apparatus of a battery cell according to claim 1,
    wherein the pair of gripper handles are spaced apart from each other by a predetermined distance and the distal ends are axially aligned with each other to be in contact with both ends of the edge of the at least one electrode.

6. The electrode transferring apparatus of a battery cell according to claim 1,
wherein the electrode gripper is provided in a pair, and
wherein the pair of electrode grippers grips the at least one electrode at an upper side and a lower side of the at least one electrode.

\* \* \* \* \*